(12) United States Patent
Bickford et al.

(10) Patent No.: US 9,593,706 B2
(45) Date of Patent: Mar. 14, 2017

(54) STRUCTURAL BLIND FASTENER AND METHOD OF INSTALLATION

(71) Applicant: The Boeing Company, Seal Beach, CA (US)

(72) Inventors: Jeffry G. Bickford, Federal Way, WA (US); Mark A. Woods, Renton, WA (US); Peter A. Coronado, Renton, WA (US); Richard Whitlock, Seattle, WA (US)

(73) Assignee: The Boeing Company, Chicago, IL (US)

( * ) Notice: Subject to any disclaimer, the term of this patent is extended or adjusted under 35 U.S.C. 154(b) by 316 days.

(21) Appl. No.: 13/674,055

(22) Filed: Nov. 11, 2012

(65) Prior Publication Data

US 2014/0130335 A1    May 15, 2014

(51) Int. Cl.
| | |
|---|---|
| *F16B 19/10* | (2006.01) |
| *F16B 31/06* | (2006.01) |
| *B21J 15/04* | (2006.01) |
| *B21J 15/12* | (2006.01) |
| *B25B 31/00* | (2006.01) |

(52) U.S. Cl.
CPC ............. *F16B 31/06* (2013.01); *B21J 15/043* (2013.01); *B21J 15/12* (2013.01); *B25B 31/00* (2013.01); *F16B 19/1054* (2013.01); *F16B 19/1072* (2013.01); *Y10T 29/49948* (2015.01)

(58) Field of Classification Search
CPC .............. F16B 19/1054; F16B 19/1045; F16B 19/1072; B25B 27/06; B25B 27/10; B25B 27/14; B25B 27/023; B25B 23/02; B21J 15/043

USPC ...... 411/34, 38, 43; 29/278, 255, 256; 81/55
See application file for complete search history.

(56) References Cited

U.S. PATENT DOCUMENTS

| | | | |
|---|---|---|---|
| 232,414 A | 7/1943 | Eklund | |
| 2,789,597 A * | 4/1957 | La Torre | B25B 27/0014 81/55 |
| 2,882,773 A * | 4/1959 | Wing | B25B 13/488 81/475 |
| 2,887,003 A | 5/1959 | Brilmyer | |
| 2,914,106 A * | 11/1959 | Boyd | 411/38 |
| 3,028,777 A * | 4/1962 | Essex | B25B 27/0014 81/55 |
| 3,030,705 A * | 4/1962 | Gill | 29/525.11 |
| 3,128,655 A * | 4/1964 | Keasler | 81/55 |
| 323,614 A | 2/1966 | Wing | |
| 3,465,637 A * | 9/1969 | Cushman et al. | 411/40 |
| 4,230,017 A | 10/1980 | Angelosanto | |

(Continued)

FOREIGN PATENT DOCUMENTS

| | | |
|---|---|---|
| WO | WO2007100906 | 9/2007 |
| WO | WO2010047954 | 4/2010 |

OTHER PUBLICATIONS

International Search Report, PCT/US2013/069213, dated Feb. 7, 2014.

(Continued)

*Primary Examiner* — Flemming Saether

(57) ABSTRACT

A two-piece, one-sided-installation fastener system may have an internally-threaded sleeve having a shank and a sleeve head. The fastener system may include an externally-threaded core bolt having a frangible driving provision and a core bolt head.

11 Claims, 10 Drawing Sheets

(56) References Cited

U.S. PATENT DOCUMENTS

| | | | |
|---|---|---|---|
| 4,289,049 A * | 9/1981 | Rebish | B25B 21/002 81/56 |
| 4,457,652 A | 7/1984 | Pratt | |
| 4,499,647 A * | 2/1985 | Sakamura et al. | 29/509 |
| 4,836,062 A | 6/1989 | LaTorre | |
| 5,259,713 A * | 11/1993 | Renner et al. | 411/34 |
| 5,498,110 A | 3/1996 | Stencel et al. | |
| 5,634,751 A | 6/1997 | Stencel et al. | |
| 5,816,761 A | 10/1998 | Cassatt et al. | |
| 5,947,667 A | 9/1999 | Cassatt et al. | |
| 6,036,418 A | 3/2000 | Stencel et al. | |
| 6,676,347 B2 | 1/2004 | Jensen | |
| 6,868,757 B2 | 3/2005 | Hufnagl et al. | |
| 7,150,594 B2 | 12/2006 | Keener | |
| 7,260,998 B2 | 8/2007 | Madden et al. | |
| 7,857,563 B2 | 12/2010 | Pratt | |
| 2004/0231467 A1 | 11/2004 | Hufnagl et al. | |
| 2006/0177284 A1 | 8/2006 | Keener | |
| 2009/0053006 A1 * | 2/2009 | Hufnagl et al. | 411/34 |
| 2010/0296895 A1 | 11/2010 | Cassatt | |
| 2012/0011702 A1 * | 1/2012 | Pratt | 29/525.02 |
| 2012/0082527 A1 | 4/2012 | Grether | |
| 2015/0196951 A1 * | 7/2015 | Bigot | B21J 15/043 29/525.06 |

OTHER PUBLICATIONS

International Preliminary Report on Patentability, PCT/US2013/069213, dated May 12, 2015.
Monogram, "Composie-Look" Product Description, available at <http://www.monogramaerospace.com/products/blind_bolts/composi-lok> retrieved on Nov. 11, 2012.
Cherry, "Maxi-Bolt" Brochure, retrieved from Cherry Aerospace web site on Nov. 11, 2012.
Alcoa, "Ergo-Tech" Brochure, retrieved from Alcoa Fastening Systes web site on Nov. 11, 2011.
Alcoa, "Accu-Lok" Product Description, available at <http://www.alcoa.com/fastening_systems/aerospace/en/product.asp>, retrieved from Alcoa Fastening Systems web site on Nov. 11, 2012.
Alcoa, "Ti-Matic Blind Bolt" Product Description, available at <http://www.alcoa.com/fastening_systems/aerospace/en/product.asp>, retrieved from Alcoa Fastening Systems web site on Nov. 11, 2012.
Alcoa, "UAB Blind Bolt" Product Description, available at <http://www.alcoa.com/fastening_systems/aerospace/en/product.asp>, retrieved from Alcoa Fastening Systems web site on Nov. 11, 2012.

* cited by examiner

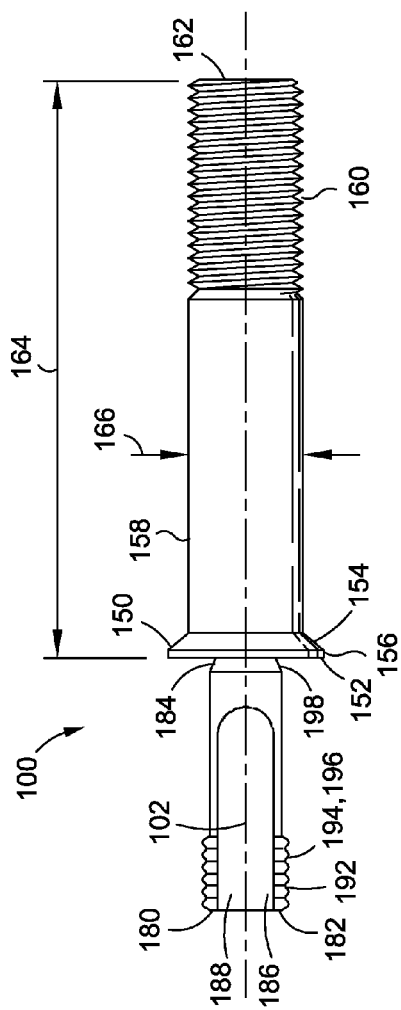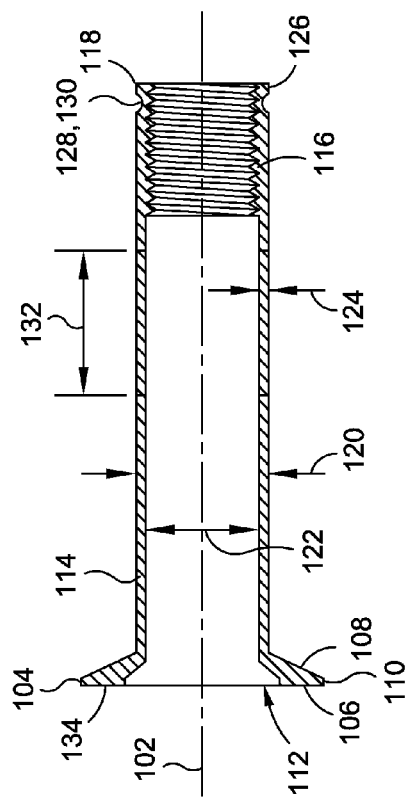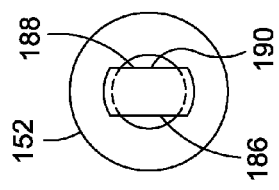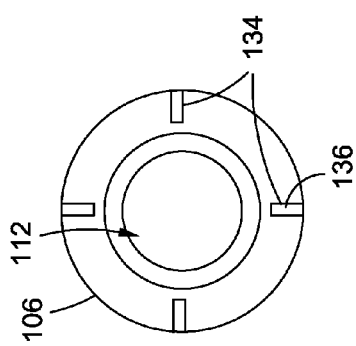

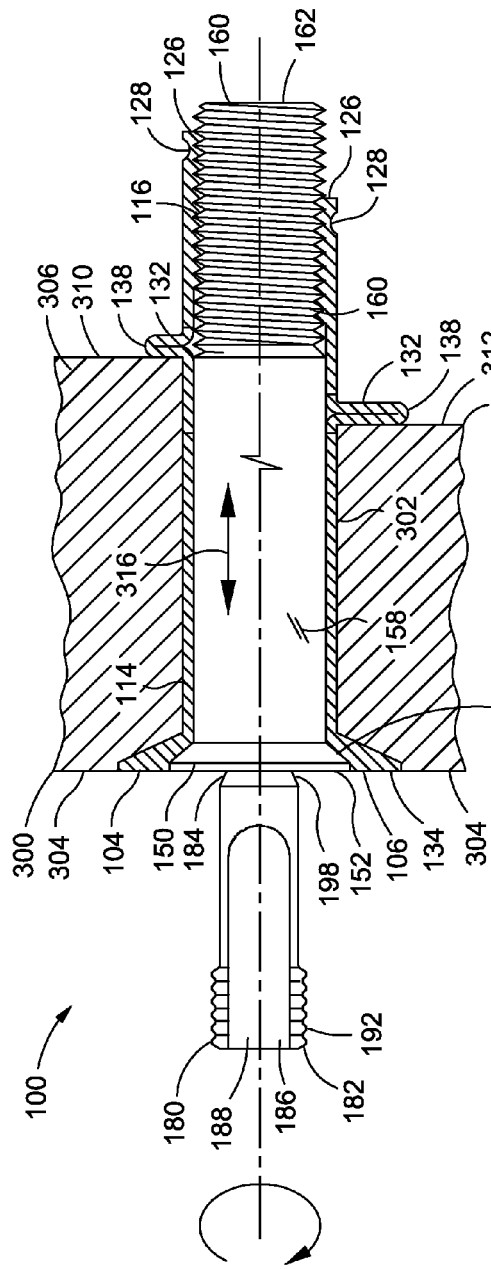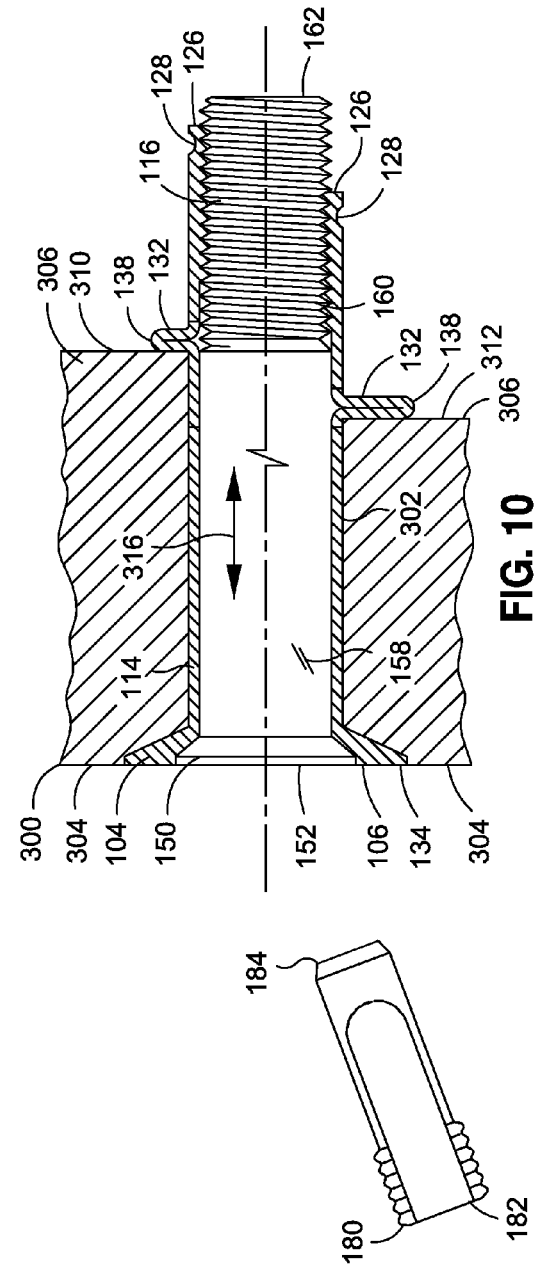

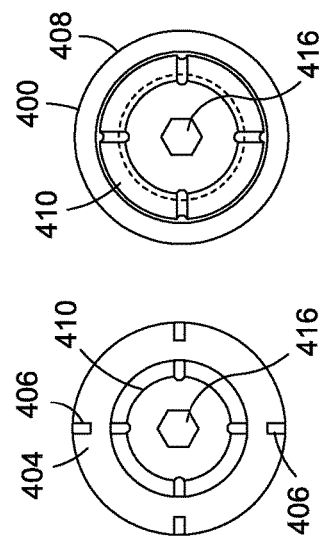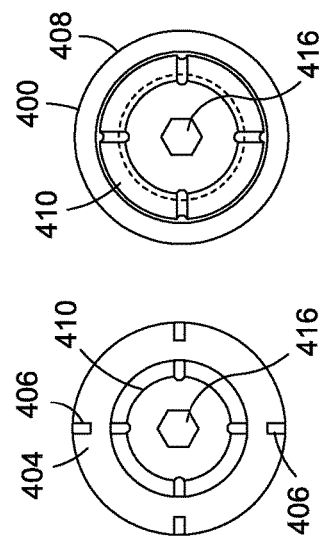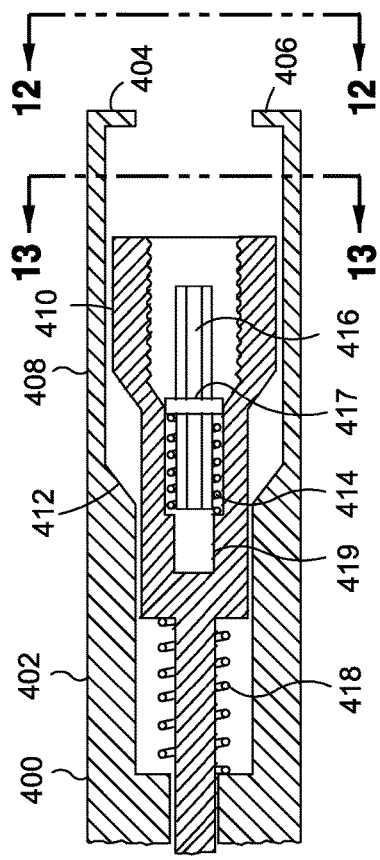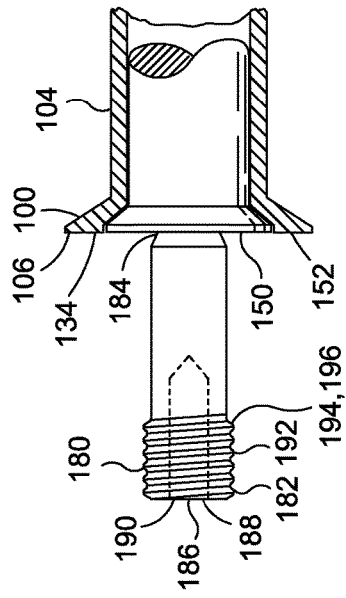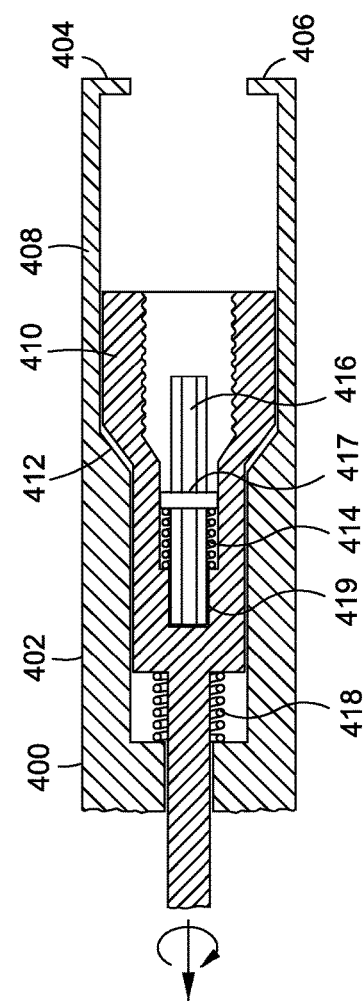
FIG. 11
FIG. 12
FIG. 13
FIG. 14
FIG. 15

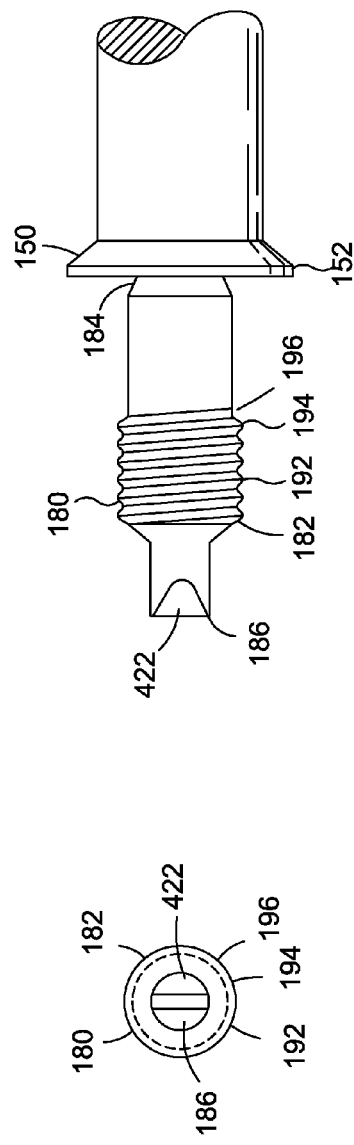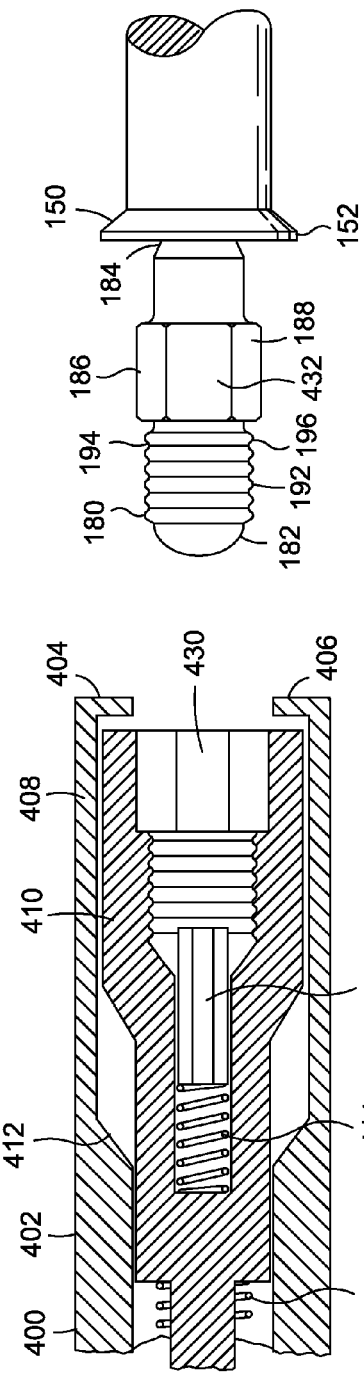

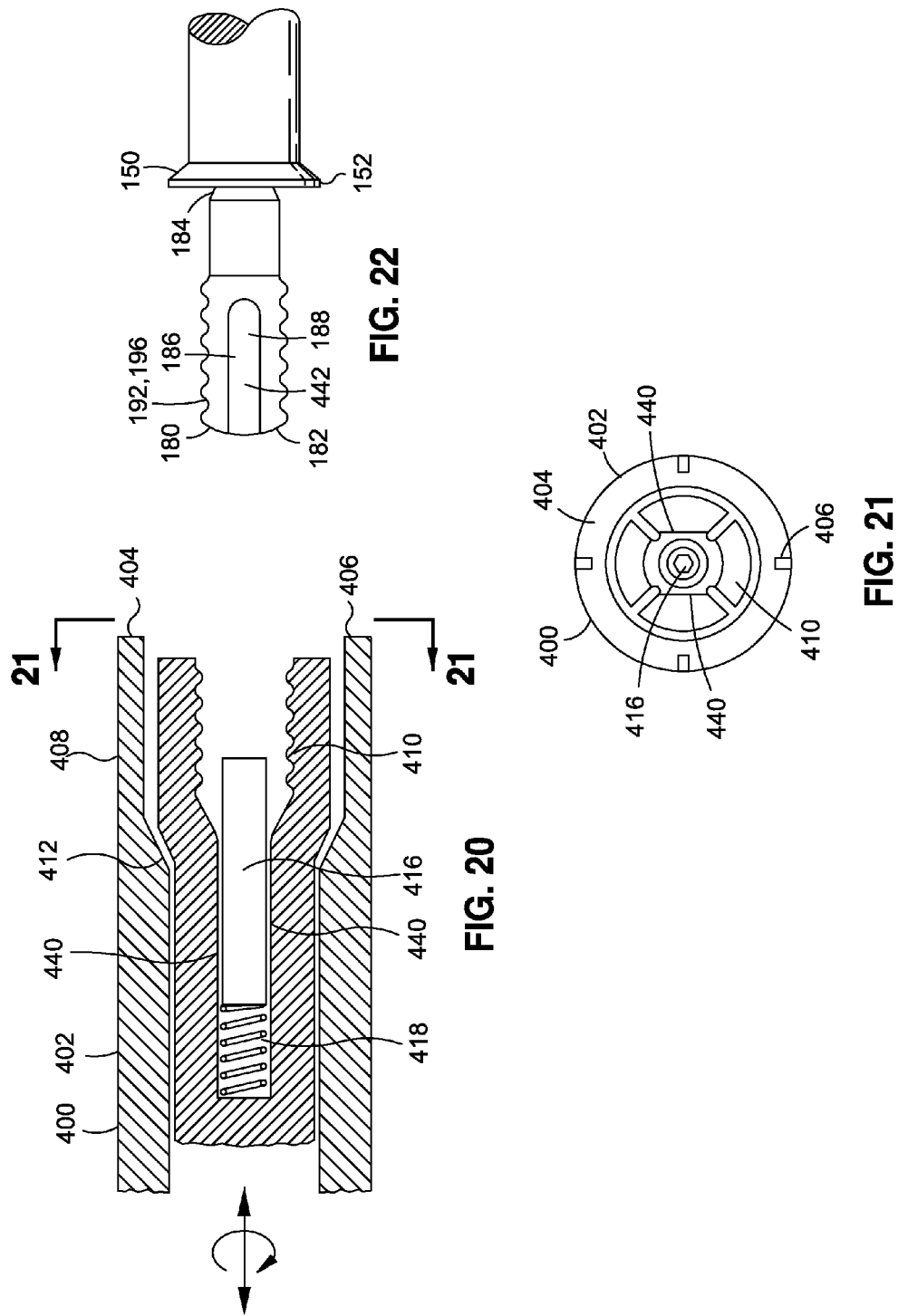

STRUCTURAL BLIND FASTENER AND METHOD OF INSTALLATION

FIELD

The present disclosure relates generally to fasteners and, more particularly, to a blind structural fastener and the installation thereof in a structure.

BACKGROUND

Mechanical fasteners are widely used for joining two or more components of a structural assembly. For example, mechanical fasteners are used extensively for joining the structural components of an airframe. One-sided-installation fasteners or blind fasteners may be used in applications where access to one side of a structural assembly is unavailable. One-sided-installation fasteners may be inserted into a hole and a portion of the fastener on the blind side of the hole may be deformed. The deformed portion of the fastener on the blind side of the hole provides a bearing feature to induce preload in the fastener such that the components of the structural assembly may be clamped together.

Certain types of existing one-sided-installation fasteners may provide for a relatively large bearing area on the blind side of the hole. Unfortunately, such fasteners may either lack the ability to induce a relatively high level of preload in the fastener or such fasteners may provide for a relatively small amount of thickness variation or grip range of the clamped components. Other types of existing one-sided-installation fasteners may provide a relatively high level of fastener preload or a relatively large grip range of the clamped components. However, such fasteners may provide a small amount of bearing area which may limit the tension capability of the fastened joint.

Still other types of existing one-sided-installation fasteners may allow for a relatively large grip range of the clamped components or a relatively large amount of bearing area on the blind side of the hole. However, such fasteners may induce a relatively low level of preload in the fastener. Furthermore, the process of installing certain one-sided-installation fasteners may result in the twisting and/or inconsistent plastic deformation of the deformed portion of the fastener which may reduce the repeatability of the preload level from fastener to fastener.

Additionally, certain one-sided-installation fasteners having separate components for the head and the blind side feature may allow the deformed portion to rotate during installation which may cause damage to the structure. Furthermore, in certain one-sided-installation fasteners, the blind side formations may form in a manner allowing axial loads to produce further deformation after installation of the fastener is complete. For example, certain one-sided-installation fasteners may have an open-ended deformable portion. Excessive axial loading of the structure after the fastener is installed may result in further deformation of the deformed portion. Unfortunately, when the axial load is removed, the fastener joint may exhibit looseness in the axial direction as a result of the deformation of the open-ended deformed portion.

As can be seen, there exists a need in the art for a one-sided-installation fastener that provides for a relatively large bearing area on the blind side of the hole, a relatively high level of preload in the fastener, and a relatively large amount of thickness variation of the clamped components. In addition, there exists a need in the art for a one-sided-installation fastener with minimal or non-existent twisting of the deformed portion of the fastener during installation, and wherein the fastener is prevented from rotating relative to the structure during fastener installation, and the fastener resists additional deformation of the deformed portion after installation.

SUMMARY

The above-noted needs associated with fastener systems are addressed and alleviated by the present disclosure, which, in a configuration, provides a two-piece, one-sided-installation fastener system having an internally-threaded sleeve having a shank and a sleeve head. The fastener system also includes an externally-threaded core bolt having a frangible driving provision and a core bolt head.

In a further configuration, disclosed is a fastener system having an internally-threaded sleeve having a shank and a sleeve head. The fastener system includes an externally-threaded core bolt having a frangible driving provision and a core bolt head. The sleeve may have an annealed portion extending along a portion of a sleeve length. The frangible driving provision may include a rotation feature and/or an axial translation feature for respectively rotating and axially translating the core bolt relative to the sleeve.

Also disclosed is a method of installing a two-piece, one-sided-installation fastener system including the steps of inserting a core bolt and a sleeve into a hole having a front side and a back side. The core bolt may have a frangible driving provision coupled to a core bolt head. The method may further include translating the core bolt backward away from the front side of the hole, and buckling a softened portion of the sleeve to form a buckled sleeve portion. The method may additionally include flattening the buckled sleeve portion against the back side of the hole, and rotating the core bolt relative to the sleeve to apply or increase tension preload in the fastener system.

The features, functions, and advantages that have been discussed can be achieved independently in various configurations of the present disclosure or may be combined in yet other configurations, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 1 is a side view of a core bolt of a two-piece, one-sided-installation fastener system;

FIG. 2 is an end view of the core bolt having a frangible driving provision included with the core bolt head;

FIG. 3 is a sectional side view of a sleeve of the two-piece, one-sided-installation fastener system having a softened portion along a portion of a length of the sleeve;

FIG. 4 is an end view of the sleeve;

FIG. 9 is a sectional side view of the fastener system illustrating rotation of the frangible driving provision and the core bolt relative to the sleeve to apply a tension in the fastener system for minimum and maximum grip installations;

FIG. 10 is a sectional side view of the core bolt, sleeve, and structure and further illustrating the separation of the frangible driving provision from the core bolt head at a pre-defined fastener preload for minimum and maximum grip installations;

FIG. 11 is a sectional side view of a configuration of an installation tool;

FIG. 12 is an end view of the installation tool;

FIG. 13 is a sectional end view of the installation tool;

FIG. 14 is a sectional side view of a further configuration of an installation tool;

FIG. 15 is a side view of a frangible driving provision configured complementary to the installation tool shown in FIG. 14;

FIG. 16 is a side view of a configuration of a frangible driving provision;

FIG. 17 is an end view of the frangible driving provision shown in FIG. 16;

FIG. 18 is a sectional side view of a further configuration of an installation tool;

FIG. 19 is a side view of a frangible driving provision configured complementary to the installation tool shown in FIG. 18;

FIG. 20 is a sectional side view of a further configuration of an installation tool;

FIG. 21 is a sectional end view of the installation tool shown in FIG. 20;

FIG. 22 is a side view of a frangible driving provision configured complementary to the installation tool shown in FIG. 20;

DETAILED DESCRIPTION

Figure 5:
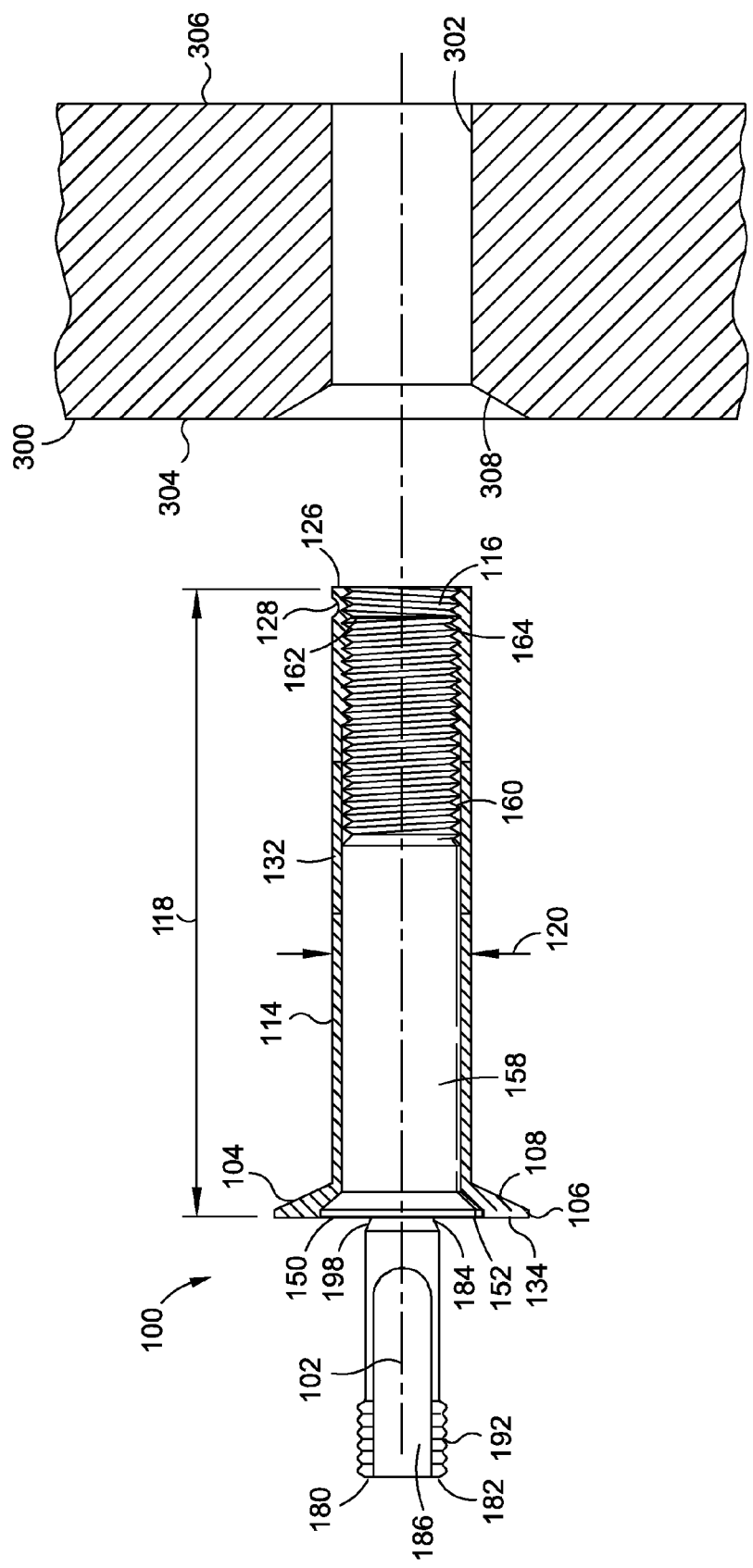
FIG. 5 is a sectional side view of the core bolt assembled with the sleeve prior to installation in a hole in a structure.

Referring now to the drawings wherein the showings are for purposes of illustrating preferred and various configurations of the disclosure, shown in FIG. 1 is a side view of a core bolt 150 of a two-piece, one-sided-installation fastener system 100. FIG. 3 is a side view of a sleeve 104 that may be sized and configured to be assembled with the core bolt 150 of FIG. 1 for installation in a hole 302 of a structure 300 (FIG. 5). In FIG. 1, the core bolt 150 may include a core bolt head 152 having a core bolt shank 158. The core bolt shank 158 may have external core bolt threads 160 formed along at least a portion of a length of the core bolt shank 158 and terminating at a core bolt end 162. Although the core bolt shank 158 is shown as being substantially devoid of threads along a majority of the core bolt length 164, the core bolt shank 158 may be threaded along any portion of the core bolt length 164 from the core bolt head 152 to the core bolt end 162.

In FIG. 1, the core bolt threads 160 may be formed at a smaller diameter than the core bolt diameter 166. However, the core bolt threads 160 may be formed at any diameter relative to the core bolt diameter 166. The core bolt 150 is shown as having a countersunk head 156 having a core bolt bearing surface 154 with a tapered configuration. However, the core bolt head 152 may be provided in any configuration including a protruding head configuration (not shown) wherein the core bolt bearing surface 154 may have a generally flat or non-tapered configuration.

In FIG. 1-2, a frangible driving provision 180 may be included with the core bolt head 152. In a configuration, the frangible driving provision 180 may be integrally formed with the core bolt head 152 and the core bolt shank 158. The frangible driving provision 180 may have a generally elongated shape and may protrude outwardly from the core bolt head 152. The frangible driving provision 180 may be generally aligned with a fastener axis 102 of the core bolt 150 and may have a generally smaller outer diameter than the core bolt head 152.

The frangible driving provision 180 may include an axial translation feature 192 and a rotation feature 186. The axial translation feature 192 may be configured to facilitate axial translation or displacement of the core bolt head 152 along a backward direction away from a front side 304 (FIG. 5) of the structure 300 (FIG. 5) to cause buckling of a softened portion 132 (FIG. 5) of the sleeve 104 (FIG. 3) against a back side 306 (FIG. 5) of the structure 300 during an initial part of the installation of the fastener system 100. The rotation feature 186 may be configured to rotate the core bolt 150 relative to the sleeve 104 to apply a tension preload in the fastener system 100 after the buckling of the softened portion 132 against the back side 306 of the structure 300 as described in greater detail below.

Figure 7:
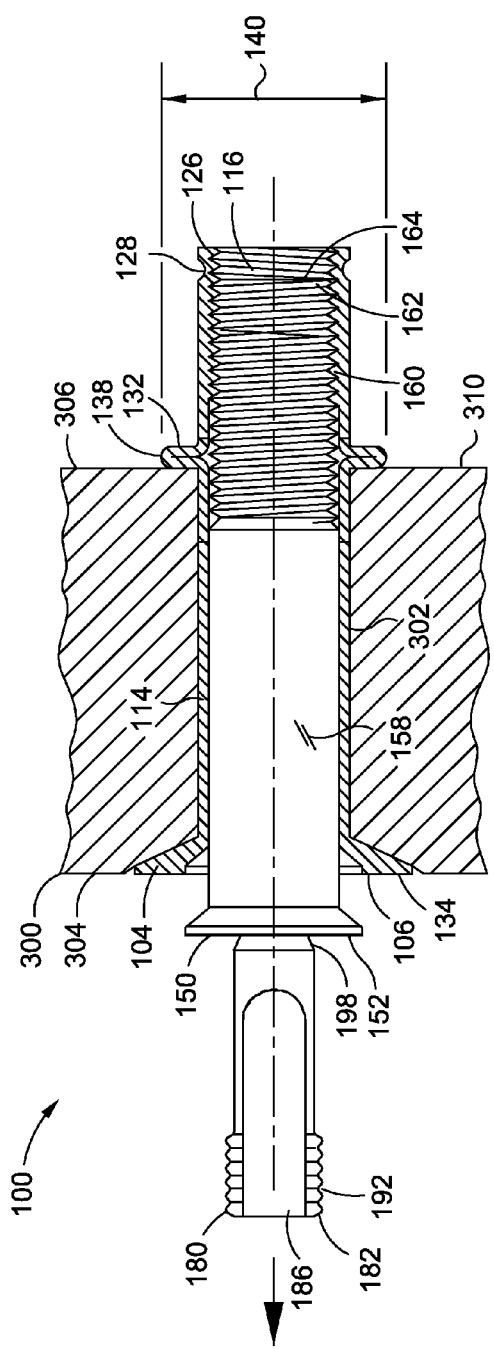
FIG. 7 is a sectional side view of the fastener system in a maximum grip installation and illustrating the frangible driving provision and core bolt being axially translated backward away from a front side of the structure and buckling of the softened portion of the sleeve.
Figure 8:
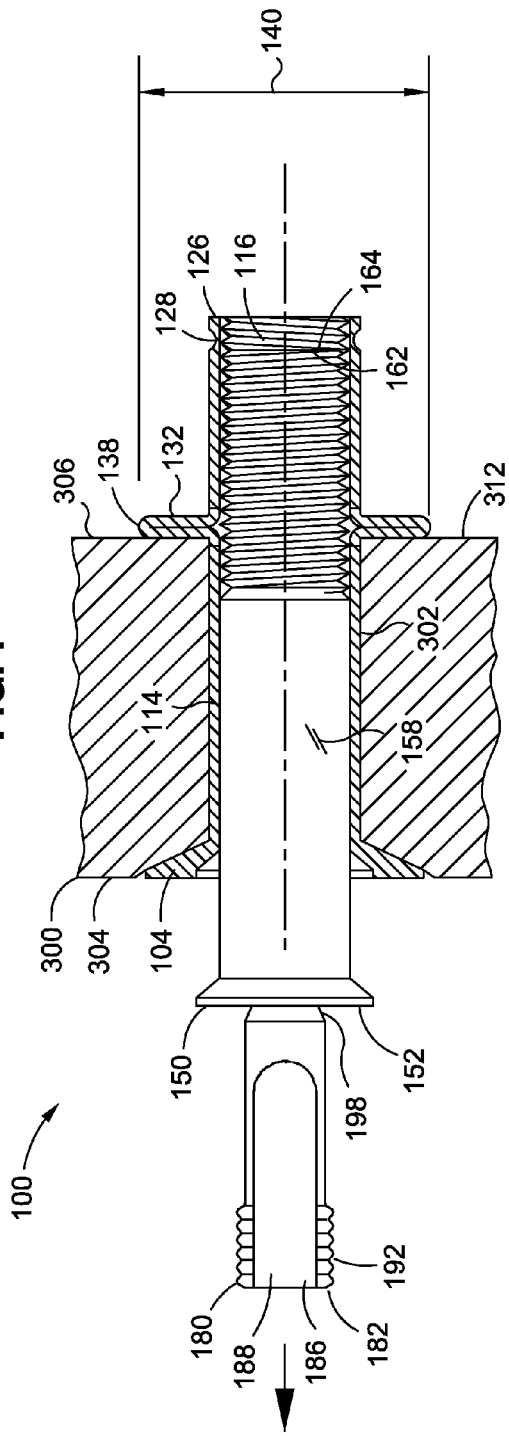
FIG. 8 is a sectional side view of the fastener system in a minimum grip installation and illustrating the frangible driving provision and core bolt axially translated backward away from the front side of the structure and buckling of the softened portion of the sleeve.

In FIG. 2, the axial translation feature 192 may comprise at least one of helical threads 194 (FIG. 15), annular grooves 196, or other geometry that may be formed on the frangible driving provision 180 for axially translating the core bolt 150. The helical threads 194 may be formed on an exterior of the frangible driving provision 180 and may be configured to be engaged by an installation tool 400 (FIGS. 11-14) for installing the fastener system 100. For example, the helical threads 194 may be formed at the same thread pitch and thread size as the internal threads of a collet 410 of an installation tool 400 (FIGS. 11-14) as described below. The helical threads 194 may be interrupted by a pair of opposing flats of the rotation feature 186 of the frangible driving provision 180, or the helical threads 194 may be continuous (not shown) around the frangible driving provision 180. The helical threads 194 may be formed at a length that allows for sufficient engagement by the collet 410 threads such that the installation tool 400 may transfer an axial load (not shown) of sufficient magnitude to the frangible driving provision 180 to flatten the buckled sleeve portion 138 against the back side 306 of the structure 300 as shown in FIGS. 7-8.

The axial translation feature 192 may optionally comprise annular grooves 196 (FIGS. 1, 19, and 22) that may be configured complementary to a collet 410 (FIGS. 18 and 20) of an installation tool 400 such that the collet 410 may grip the annular groves 196 and axially translate the core bolt 150 away from the front side 304 of the structure 300. The annular grooves 196 in FIG. 19 may be formed at a groove pitch and diameter that is complementary to the collet 410 in FIG. 18. In addition, the annular grooves 196 may be configured to facilitate release of the frangible driving provision 180 from the collet 410 when the frangible driving provision 180 fractures off of the core bolt head 152 as illustrated in FIG. 10 and described below. For example, although not shown, the annular grooves 196 may have ramped surfaces to allow the collet 410 to slidably release the frangible driving provision 180 after fracturing off of the core bolt head 152.

Although shown as being formed on an exterior of the frangible driving provision 180, the axial translation feature 192 may be formed on an interior of the frangible driving provision 180 such as within a bore (not shown) that may be formed within the frangible driving provision 180. The rotation feature 186 may comprise one or more faceted surfaces 188 or other features formed on the interior or exterior of the frangible driving provision 180 and configured to facilitate rotation of the frangible driving provision 180 and the core bolt 150. For example, FIG. 2 illustrates the frangible driving provision 180 having external faceted surfaces 188 comprising opposing flats 190 for receiving a rotational drive member (e.g., a rotational socket with a rectangular slot—not shown) of an installation tool described below.

The frangible driving provision 180 may be configured to be separated from the core bolt head 152 following the application of tension preload in the fastener system 100. For example, the frangible driving provision 180 may comprise a frangible pintail 182 having a break groove 184 at an interface 198 between the frangible pintail 182 and the core bolt head 152. The break groove 184 may provide a reduced cross sectional area at the interface 198 relative to the cross sectional area along a remainder of the frangible pintail 182.

Referring to FIG. 3, shown is a side view of the sleeve 104 of the two-piece, one-sided-installation fastener system 100. The sleeve 104 may have a sleeve head 106 and a sleeve shank 114 having a generally hollow tubular configuration extending from the sleeve head 106 to a sleeve tail 126 and defining a sleeve length 118. The sleeve 104 may have a sleeve inside diameter 122 sized complementary to the core bolt diameter 166 (FIG. 1). The sleeve 104 may have a sleeve outside diameter 120 that may be sized complementary to the diameter of a hole 302 (FIG. 5) in the structure 300 (FIG. 5). For example, the sleeve outside diameter 120 may be sized and configured to provide a clearance fit or an interference fit with a hole 302 in the structure 300 (FIG. 5) as described below. The sleeve shank 114 may be provided in a sleeve wall thickness 124 that may be dictated in part by the sleeve outside diameter 120. For example, for a sleeve outside diameter 120 of approximately 0.25 inch, the sleeve wall thickness 124 may be approximately 0.015 to 0.030 inch. For a sleeve outside diameter 120 of approximately 0.38 inch, the sleeve wall thickness 124 may be approximately 0.030 to 0.050 inch. However, the sleeve 104 may be provided in any sleeve wall thickness 124 and is not limited to the above noted ranges.

In FIG. 3, the sleeve 104 may include a softened portion 132 such as an annealed portion extending along at least a portion of the sleeve length 118. The softened portion 132 may be positioned along the sleeve length 118 such that the softened portion 132 may be buckled against the back side 306 (FIG. 5) of the structure 300 to form a buckled sleeve portion 138 (FIG. 7). The softened portion 132 may be annularly-shaped or band-shaped and may have increased ductility, increased softness, increased propensity to buckle under axially-compressive loading, and/or increased formability relative to the ductility, softness, propensity to buckle, or formability of the sleeve 104 at locations outside of the softened portion 132. The softened portion 132 may be formed in the sleeve 104 by any one of a variety of different means including, but not limited to, localized heat treatment or annealing of the sleeve 104 such as by using an inductive coil (not shown) placed over the sleeve 104 at a location where softening of the sleeve 104 material is desired. The softened portion 132 may also be formed in the sleeve 104 by varying the sleeve cross-section (not shown) such as with a reduced sleeve wall thickness (not shown) which may provide an increased propensity for buckling under axial loading. However, the softened portion 132 may be formed in the sleeve 104 in any one of a variety of different means and is not limited to annealing by localized heat treatment.

In FIG. 3, the sleeve shank 114 may include internal sleeve threads 116 formed on an end of the sleeve 104. The internal sleeve threads 116 may be formed complementary to the core bolt threads 160 and may terminate at the sleeve tail 126. The sleeve tail 126 may include a locking feature 128 configured to restrict rotation of the core bolt 150 relative to the sleeve 104 such as after installation of the fastener system 100 in a structure. The locking feature 128 may comprise a sleeve annular groove 130 that may be formed on the sleeve shank 114 adjacent the sleeve tail 126. However, the locking feature 128 may be configured in any one of a variety of different configurations and is not limited to a sleeve annular groove 130. In this regard, the locking feature 128 may comprise any mechanism that may restrict rotation of the core bolt threads 160 relative to the internal sleeve threads 116. For example, the locking feature 128 may comprise a nylon patch formed on the internal sleeve threads 116 adjacent the sleeve tail 126. Alternatively, the locking feature 128 may comprise a local deformation of the internal sleeve threads 116 to restrict rotation of the core bolt 150 relative to the sleeve 104 following installation of the fastener system 100 within a structure.

Referring to FIGS. 3-4, the sleeve 104 is shown as having a countersunk head 110 having a sleeve bearing surface 108 with a tapered configuration for bearing against a structure 300 (FIG. 5). However, the sleeve head 106 may be provided in a protruding head configuration (not shown) wherein the sleeve bearing surface 108 may be generally flat and/or parallel to a surface of the structure 300. In this regard, the sleeve head 106 may be provided in any configuration and is not limited to a countersunk head configuration or a protruding head configuration. The sleeve head 106 may include a core bolt pocket 112 that may be sized and configured to receive the core bolt head 152. In the configuration shown, the sleeve head 106 is sized and configured to receive a core bolt 150 having a countersunk configuration as shown in FIG. 1. However, as indicated above, the sleeve head 106 and the core bolt head 152 may be provided in any one of a variety of combinations of a countersunk head, a protruding head (not shown), or other head configurations.

In FIG. 4, the sleeve head 106 may include an anti-rotation feature 134 to provide a means for preventing rotation of the sleeve 104 relative to the core bolt 150 and/or relative to a hole 302 (FIG. 5) in the structure 300 (FIG. 5) during installation of the fastener system 100. For example, the sleeve head 106 may include one or more indentations or protrusions 136 that may be sized and configured to be engaged by an installation tool (not shown) to prevent rotation of the sleeve 104 relative to the core bolt 150 and/or a hole 302 (FIG. 5) through which the sleeve 104 extends.

The sleeve 104 and the core bolt 150 may be formed of any one of a variety of different materials including any metallic material and/or nonmetallic material. For example, the core bolt 150 and/or the sleeve 104 may be formed of titanium alloys including 6-6-2Ti, 6-4Ti, 3-8Ti and other titanium alloys. The core bolt 150 and/or the sleeve 104 may also be formed of steel and/or stainless steel including stainless steel alloys such as A286, A304, and A266 CRES or other stainless steel alloys. The core bolt 150 and/or the sleeve 104 may also be formed of inconel, nickel, cobalt and any alloys or combinations thereof Referring to FIG. 5, shown is the core bolt 150 assembled with the sleeve 104 prior to installation of the core bolt 150/sleeve 104 assembly into a hole 302 of a structure 300. The structure 300 may have a front side 304 and a back side 306. The core bolt 150 is preferably sized such that the core bolt shank 158 of the core bolt 150 is not engaged in the locking feature 128 of the sleeve 104 when the fastener system 100 is initially installed in the hole 302 and prior to axially translating the core bolt 150. In FIG. 5, the locking feature 128 of the sleeve 104 may occupy approximately 2-3 or more of the internal sleeve threads 116. The softened portion 132 of the sleeve 104 is preferably positioned along the sleeve length 118 such that at least a part of the softened portion 132 lies beneath the surface of the back side 306 of the structure 300, as described in greater detail below.

In FIG. 5, the front side 304 of the structure 300 may have a structure bearing surface 308 that may be configured complementary to the sleeve bearing surface 108. For example, for a sleeve head 106 having a countersunk configuration with a tapered bearing surface, the structure bearing surface 308 may likewise be tapered. The hole 302 may have a hole 302 diameter that is preferably sized and configured complementary to the sleeve outside diameter 120. The hole 302 may be sized and configured to provide a clearance fit with the sleeve outside diameter 120 or to provide an interference fit with the sleeve outside diameter 120. In a configuration, the fastener system 100 may be installed by coating the sleeve 104 with a sealant prior to insertion into a hole 302 of a structure 300. For example, for installing a metallic sleeve 104/core bolt 150 assembly within a composite structure 300, the sleeve 104 may be coated with a wet sealant to protect against galvanic corrosion. The sleeve 104 may also include one or more types of coatings as part of its finished state. Such coatings may reduce friction during insertion of the sleeve 104 into a hole 302 (e.g., an interference fit hole) or for ease of installation in other types of holes such as clearance holes. Such coatings may comprise a lubricious coating such as an aluminum pigmented coating, dry film lubricant (e.g., molybdenum disulfide), or any one of a variety of other types of coatings.

Figure 6:
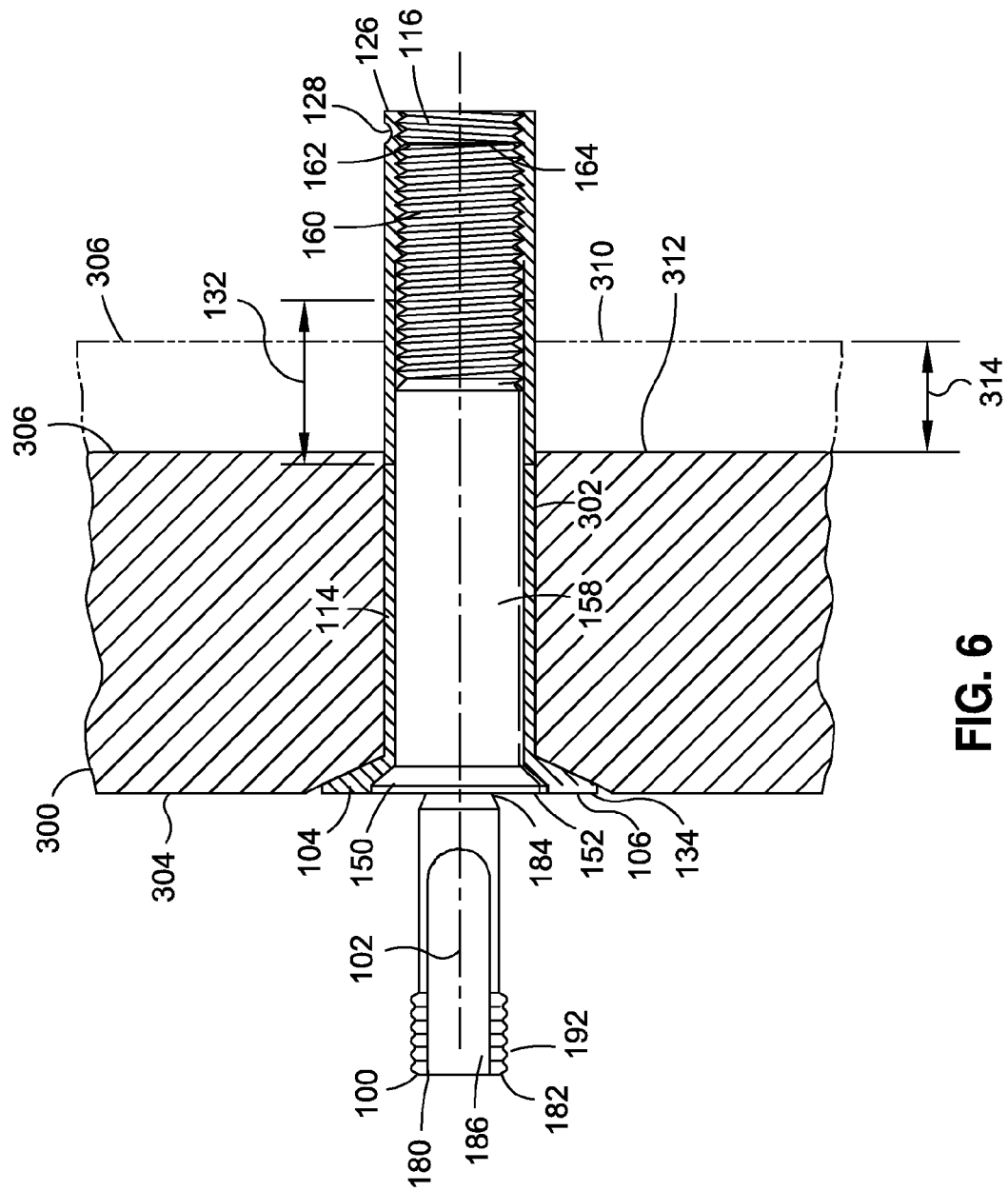
FIG. 6 is a sectional side view of the core bolt and sleeve installed in the structure and illustrating a minimum grip and a maximum grip capability of the fastener system.

Referring to FIG. 6, shown is a side view of the core bolt 150 and sleeve 104 installed in the structure 300 and illustrating a minimum grip 312 and a maximum grip 310 capability of the fastener system 100. FIG. 6 illustrates a structure 300 shown in solid lines representing a minimum grip 312 application for the fastener system 100. In a minimum grip 312 application, the sleeve 104 may be configured such that the softened portion 132 of the sleeve 104 extends above and below the surface of the back side 306 of the structure 300 to allow for buckling of the softened portion 132 against the back side 306. FIG. 6 also illustrates a structure 300 shown in phantom lines representing a maximum grip 310 application for the fastener system 100. In a maximum grip 310 application, the sleeve 104 may be configured such that the softened portion 132 of the sleeve 104 extends above and below the back side 306 of the structure 300 to allow for buckling of the softened portion 132 against the back side 306.

Advantageously, the presently-disclosed fastener system 100 may be installed for a relatively large grip range 314 (e.g., large thickness variation) of structure 300. For example, a single configuration of the presently-disclosed fastener system 100 may include a softened portion 132 that provides for a grip range 314 of at least 0.10 inch. Such a relatively large grip range 314 provided by the presently-disclosed fastener system 100 advantageously minimizes the quantity of different fastener lengths that must be maintained in stock in comparison to the larger quantity of different fastener lengths that must be maintained in stock for conventional fastener systems having a relatively small grip range 314 (e.g., 0.050 or 0.063 inch). Additionally, a relatively large grip range may provide additional grip capability where installations may occur outside of the expected structural thicknesses due to structure manufacturing tolerances.

Referring to FIG. 7, shown is a side view of the fastener system 100 in an initial stage of installation in a maximum grip 310 application. The frangible driving provision 180 and the core bolt 150 are axially translated along a backward direction away from a front side 304 of the structure 300. The axial translation of the core bolt 150 may be provided by engaging the axial translation feature 192 of the frangible driving provision 180 with an installation tool as described below. The sleeve head 106 may be maintained in contact with the structure bearing surface 308 (FIG. 5) during axial translation of the core bolt 150. Displacement of the core bolt head 152 away from the front side 304 results in buckling of the softened portion 132 against the back side 306 of the structure 300. The softened portion 132 may buckle radially outwardly into a flattened, annularly-shaped, buckled sleeve portion 138 against the back side 306 of the structure 300.

Referring to FIG. 8, shown is a side view of the fastener system 100 during installation in a minimum grip 312 application. The core bolt head 152 is displaced at a greater distance away from the front side 304 of the structure 300 relative to the amount of core bolt head 152 displacement for the maximum grip 310 application shown in FIG. 7. In addition, the buckled sleeve portion diameter 140 for the minimum grip 312 application shown in FIG. 8 is larger than the buckled sleeve portion diameter 140 of the maximum grip 310 application shown in FIG. 7.

Advantageously, the sleeve 104 may be sized and configured such that the softened portion 132 buckles against the back side 306 into a flattened buckled sleeve portion 138 having a relatively large bearing area. For example, the sleeve 104 may be sized and configured such that the softened portion 132 buckles into a buckled sleeve portion 138 having a minimum diameter of 1.2 times the sleeve outside diameter 120 (FIG. 3). In this regard, the sleeve 104 may be configured such that the buckled sleeve portion diameter 140 is in the range of from approximately 1.2 to 1.5 times the sleeve outside diameter 120 (FIG. 3). However, the sleeve 104 may be sized and configured such that the buckled sleeve portion diameter 140 is larger or smaller than 1.2 to 1.5 times the sleeve outside diameter 120.

Referring to FIG. 9, shown is the fastener system 100 wherein rotational force may be applied to the core bolt 150 using the rotation feature 186 provided on the frangible driving provision 180. The upper portion of the structure 300 in FIG. 9 represents a maximum grip 310 installation in a structure 300 and the lower portion of the structure 300 in FIG. 9 represents a minimum grip 312 installation. In FIG. 9, the buckled sleeve portion 138 is substantially fully formed such that the core bolt 150 may be rotated without twisting deformation of the buckled sleeve portion 138 which may otherwise compromise the consistency of tension preload from fastener to fastener. The core bolt 150 may be rotated relative to the sleeve 104 by engaging the faceted surfaces 188 of the rotation feature 186 of the frangible pintail 182 in a manner causing rotation of the core bolt 150 relative to the sleeve 104. For example, an installation tool (not shown) may include a rotational drive bit configured to engage the rotation feature 186 on the frangible pintail 182.

Advantageously, rotation of the core bolt 150 relative to the sleeve 104 results in the application of tension preload in the fastener system 100 or an increase in the tension preload induced in the fastener system 100 as a result of the axial translation (FIGS. 7-8) of the core bolt 150. In FIG. 9, rotation of the frangible pintail 182 causes the core bolt head 152 to translate back toward the sleeve head 106 as the core bolt threads 160 engage the locking feature 128 on the sleeve tail 126. Tension preload may increase in the fastener system 100 (e.g., in the sleeve 104 and in the core bolt 150) while the core bolt 150 is rotated relative to the sleeve 104 until reaching a pre-defined fastener preload 316.

Referring to FIG. 10, shown is the fastener system 100 installation for a maximum grip 310 installation and a minimum grip 312 installation in a structure 300. Upon reaching the predefined fastener preload 316 (FIG. 9), the frangible driving provision 180 may separate from the core bolt head 152 by fracturing at the interface 198 between the frangible pintail 182 and the core bolt head 152. For example, the frangible pintail 182 may separate from the core bolt head 152 due to torsional load causing a fracture at break groove 184 that may be formed at the interface 198 between the frangible pintail 182 and the core bolt head 152. The frangible pintail 182 may also be separated from the core bolt head 152 by axially translating (e.g., pulling) the frangible driving provision 180 until exceeding a tension load capability at the interface 198 between the frangible pintail 182 and the core bolt head 152. Still further, the frangible pintail 182 may be separated from the core bolt head 152 by bending the frangible pintail 182 relative to the core bolt head 152 and causing fracturing under bending load.

The fastener preload 316 may comprise tension preload in the core bolt 150/sleeve 104 and may correspond to compression preload in the structure 300 representing clamp-up of one or more components that make up the structure 300. The fastener system 100 may be configured to control the point (i.e., the fastener preload) at which the frangible pintail 182 rotatably fractures (e.g., twists) off of the core bolt head 152 and may be derived through analysis and/or experimentation. For example, fastener preload 316 may be characterized by a quantity of revolutions of the frangible pintail 182 relative to the sleeve 104 after the buckled sleeve portion 138 is flattened against the back side 306 of the structure 300.

Referring to FIGS. 11-14, shown is a configuration of an installation tool 400 as may be implemented for installation of the fastener system 100 (FIG. 9). The installation tool 400 may include a housing 402 having a side wall 408 and a bearing flange 404. A collet 410 may be axially slidable within the housing 402 and may bear against a taper 412 that may be formed in the housing 402. An ejection spring 418 may be included with the installation tool 400 to eject the frangible driving provision 180 from the installation tool 400 after the frangible driving provision 180 (FIG. 10) or frangible pintail 182 (FIG. 10) fractures off of the core bolt head 152 (FIG. 10). The collet 410 may be segmented as shown in FIG. 13 to allow the collet 410 segments to radially expand so that the collet 410 may be axially moved over the axial translation feature 192 (e.g., helical threads 194, annular grooves 196—FIG. 15) that may be formed on the frangible pintail 182 (FIG. 15). A rotational drive member 416 such as a hex pin may be axially slidable within the collet 410. The rotational drive member 416 (e.g., hex pin) may be engaged to the rotation feature 186 (e.g., hex bore) of the frangible pintail 182 (FIG. 15).

Referring to FIG. 12, shown is an end view of the installation tool 400 of FIG. 11 and illustrating the sleeve engagement features 406 that may be included with the bearing flange 404 for engaging anti-rotation features 134 that may be formed on the sleeve head 106 (FIGS. 3-4). FIG. 12 further illustrates a hex shape of the rotational drive member 416 (e.g., hex pin) for engaging the hex-shaped faceted surfaces 188 (e.g., hex bore) formed in the frangible pintail 182 (FIG. 15). FIG. 13 is a cross-sectional end view of the installation tool 400 illustrating the segmented collet 410 and the rotational drive member 416.

Referring to FIGS. 11-15, during operation, the installation tool 400 may be applied over the frangible pintail 182 such that the sleeve engagement features 406 on the bearing flange 404 engage the anti-rotation features 134 of the sleeve head 106. As the installation tool 400 is applied over the frangible pintail 182, the free end of the collet 410 contacts the free end of the frangible pintail 182 causing the segmented collet 410 to radially expand and axially move over the helical threads 194 that may be formed on the frangible pintail 182. The installation tool 400 may include a biasing spring 414 in the housing 402 to bias the rotational drive member 416 into the rotation feature 186 (e.g., hex-shaped bore) in the frangible pintail 182 as the collet 410 is axially moved over the helical threads 194 of the frangible pintail 182. The biasing spring 414 may have a larger diameter than an outer diameter or width of the rotational drive member 416 such that the biasing spring 414 may bear against an annular flange 417 formed on the rotational drive member 416.

After the bearing flange 404 of the installation tool 400 is seated against the sleeve head 106 and the collet 410 threads are engaged to the helical threads 194 of the frangible pintail 182, the collet 410 and the core bolt 150 may be axially translated backward away from the front side 304 (FIGS. 7-8) of the structure 300. An outer surface of the collet 410 may bear against the taper 412 formed on the interior of the housing 402 which may increase a clamping force of the collet 410 threads onto the helical threads 194 of the frangible pintail 182. The rotational drive member 416 is configured to initially prevent rotation of the core bolt 150 as the core bolt 150 is axially translated backward away from the front side 304 (FIGS. 7-8) by rotation of the collet 410. Rotation of the collet 410 continues until the softened portion 132 (FIGS. 7-8) of the sleeve 104 buckles into a flattened shape against the back side 306 of the structure 300 as shown in FIGS. 7-8.

When the flattening of the softened portion 132 (FIGS. 7-8) is completed, the rotational drive member 416 may be retracted within a hex bore 419 formed in the collet 410. The collet 410 and the rotational drive member 416 may then be rotated (FIG. 9) causing rotation of the core bolt 150 which causes an increase in tension preload in the fastener system 100 until reaching a pre-defined fastener preload. The break groove 184 in the frangible pintail 182 may be configured to separate or fracture (FIG. 10) from the core bolt head 152 at the pre-defined fastener preload. The ejection spring 418 may move the outer surface of the collet 410 away from the taper 412 in the housing 402 which may allow the segmented collet 410 to expand and release the frangible pintail 182. The frangible pintail 182 may be ejected from the collet 410 by the ejection spring 418.

Referring to FIGS. 16-17, shown is a configuration of the frangible driving provision 180 having an external rotation feature 186. The rotation feature 186 may comprise a pair of tapered flats 422 that may be sized and configured to be engaged by a complementary rotational drive member 416 (not shown) of an installation tool (not shown). The engagement of the frangible driving provision 180 in FIGS. 16-17 may be similar to the engagement described for the operation of the installation tool 400 shown in FIGS. 11-15.

Referring to FIGS. 18-19, shown is a configuration of an installation tool 400 (FIG. 18) and a complementary frangible driving provision 180 (FIG. 19). The installation tool 400 may include interior wrench flats 430 configured to engage exterior wrench flats 432 that may be formed on the frangible driving provision 180. The installation tool 400 may include a collet 410 having annular grooves configured to engage complementary annular grooves 196 formed on the frangible driving provision 180 for axially translating the core bolt 150 relative to the sleeve 104. The exterior wrench flats 432 of the installation tool 400 may then be rotated to rotate the core bolt 150 to apply the desired tension pre-load to the fastener system 100.

Referring to FIGS. 20-22, shown is a configuration of an installation tool 400 having a segmented collet 410 with interior annular grooves for engaging external annular grooves 196 formed on the frangible driving provision 180 for pulling or axially translating the core bolt 150 away from the sleeve 104. FIG. 21 illustrates a pair of interior diametrical flats 440 formed in the collet 410 for engaging a complementary pair of exterior diametrical flats 442 on the frangible driving provision 180 (FIG. 22). Operation of the installation tool 400 in FIGS. 20-22 may be similar to the operation described above for the installation tool 400 shown in FIGS. 11-15.

Figure 23:
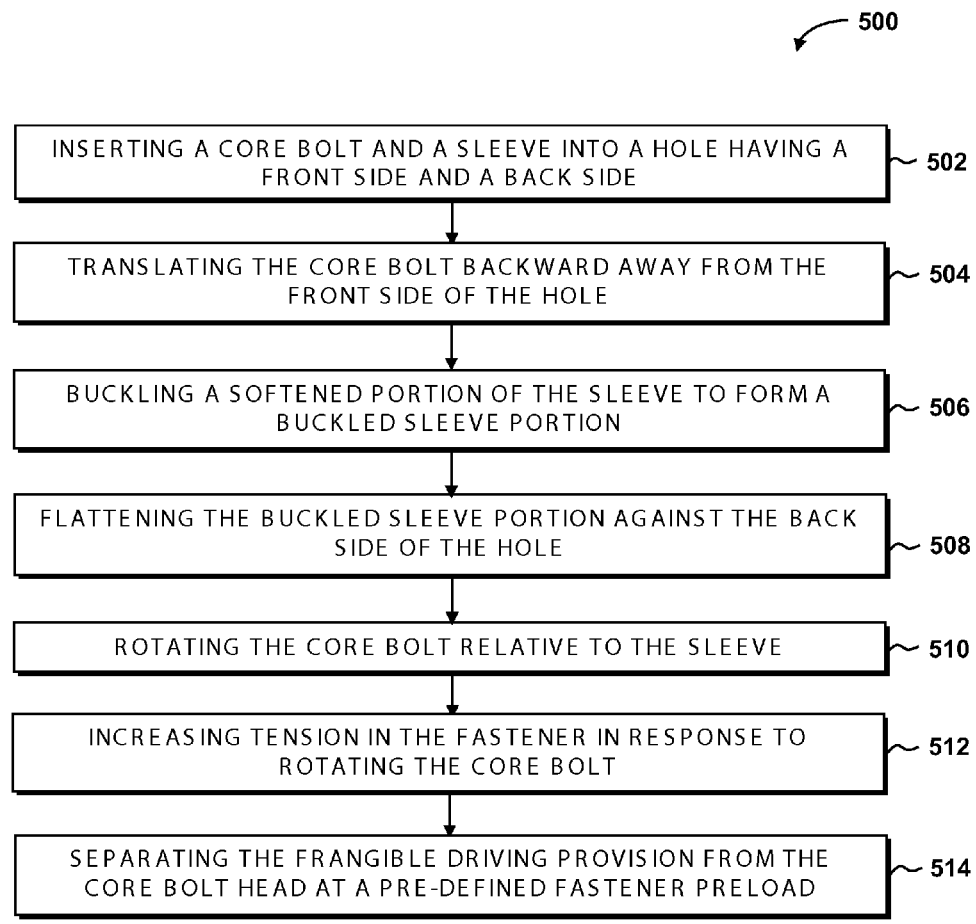
FIG. 23 is a flow diagram including one or more operations that may be included in a method of installing a two-piece, one-sided-installation fastener system.

FIG. 23 is a flow diagram of a method 500 of installing a two-piece, one-sided-installation fastener system 100 (FIG. 1) as disclosed above. Advantageously, the fastener system 100 and method disclosed herein provides a means for achieving a relatively high preload in the fastener system 100 and provides a relatively large bearing area on the back side of a structure 300. In addition, the fastener system 100 and method accommodates relatively large structure thickness variations due to the relatively large grip range provided by the fastener system 100.

Step 502 of the method 500 of FIG. 23 may comprise inserting a core bolt 150 and a sleeve 104 into a hole 302 of a structure 300 such as an aircraft structure 300 having a front side 304 and a back side 306 as shown in FIG. 6. Although the figures illustrate the structure 300 as comprising a single component, the structure 300 may be comprised of two or more components through which the fastener system 100 may be installed. As described above, the core bolt 150 has a frangible driving provision 180 coupled to a core bolt head 152. The frangible driving provision 180 may include an axial translation feature 192 (FIG. 1) and the rotation feature 186 (FIG. 1).

Step 504 of the method 500 of FIG. 23 may comprise translating the core bolt 150 backward away from the front side 304 of the hole 302 as shown in FIGS. 7-8. The core bolt 150 may be translated by engaging the axial translation feature 192 of the frangible driving provision 180 as shown in FIGS. 7-8. The sleeve head 106 may be maintained against the structure 300 to prevent axial translation thereof relative to the hole 302. In a configuration, the core bolt 150 may preferably be translated without translating or rotating the sleeve 104 and/or without rotating the core bolt 150 relative to the sleeve 104 and preferably without either the core bolt 150 or the sleeve 104 rotating relative to the hole 302.

Step 506 of the method 500 of FIG. 23 may comprise buckling a softened portion 132 of the sleeve 104 against the back side 306 of the structure 300 to form a buckled sleeve portion 138 as shown in FIGS. 7-8. The softened portion 132 may buckle radially outwardly into an annular sleeve bulb as the core bolt head 152 is translated away from the front side 304 of the structure 300 as shown in FIGS. 7-8.

Step 508 of the method 500 of FIG. 23 may comprise flattening the buckled sleeve portion 138 against the back side 306 of the structure 300 as shown in FIGS. 7-8. In this regard, the core bolt 150 may be generally translated along a direction away from the front side 304 of the structure 300 until the buckled sleeve portion 138 is generally flattened against the back side 306 of the structure 300 as shown in FIGS. 7-8. However, the process of buckling the softened portion 132 (FIGS. 7-8) may be terminated at any point prior to flattening thereof.

Step 510 of the method 500 of FIG. 23 may comprise rotating the core bolt 150 relative to the sleeve 104 as shown in FIG. 9. The core bolt 150 may be rotated by engaging a rotation feature 186 formed on the frangible driving provision 180 as shown in FIG. 9. In a configuration, the rotation feature 186 may comprise one or more faceted surfaces 188 or other rotation feature geometry that may be provided on the frangible driving provision 180 as shown in FIG. 9. During rotation of the core bolt 150, the core bolt head 152 may move back toward and nest within the core bolt pocket 112 in the sleeve head 106 as shown in FIG. 9. During rotation of the core bolt 150, the core bolt threads 160 may engage the locking feature 128 on the sleeve tail 126 as shown in FIG. 9. The method may include preventing rotation of the sleeve 104 relative to the hole 302 when rotating the core bolt 150 relative to the sleeve 104 by engaging an anti-rotation feature 134 (e.g., indentations or protrusions) that may formed on the sleeve head 106 as shown in FIG. 4.

Step 512 of the method 500 of FIG. 23 may comprise increasing tension in the fastener in response to rotating the core bolt 150 relative to the sleeve 104 (FIGS. 9-10). Advantageously, after flattening the buckled sleeve portion 138, the sleeve 104 may be restrained against rotation relative to the hole 302 (FIGS. 9-10) which may facilitate preloading the fastener. The preload may increase (e.g., in the sleeve 104 and the core bolt 150) until reaching a pre-defined fastener preload 316 level (FIG. 9).

Step 514 of the method 500 of FIG. 23 may comprise separating the frangible driving provision 180 from the core bolt head 152 at the pre-defined fastener preload 316 (FIG. 10). The frangible driving provision 180 may be rotated until separating from the core bolt 150 by exceeding the torsional capability of the interface 198 (FIG. 9) between the frangible driving provision 180 and the core bolt head 152, by pulling on the frangible driving provision 180 (FIG. 10) until exceeding the tension capability at the interface 198, or by bending the frangible driving provision 180 until exceeding the bending capability of the interface 198. The process may include separating the frangible driving provision 180 from the core bolt head 152 at a break groove 184 (FIG. 10) that may be formed at the interface 198 between the frangible driving provision 180 and the core bolt head 152.

Figure 24:
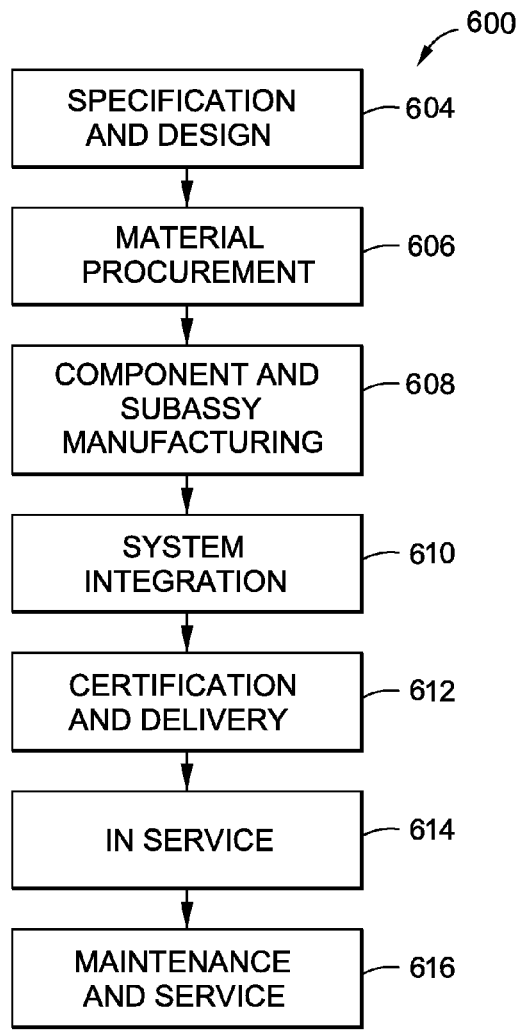
FIG. 24 is a flow diagram of an aircraft manufacturing and service methodology.
Figure 25:
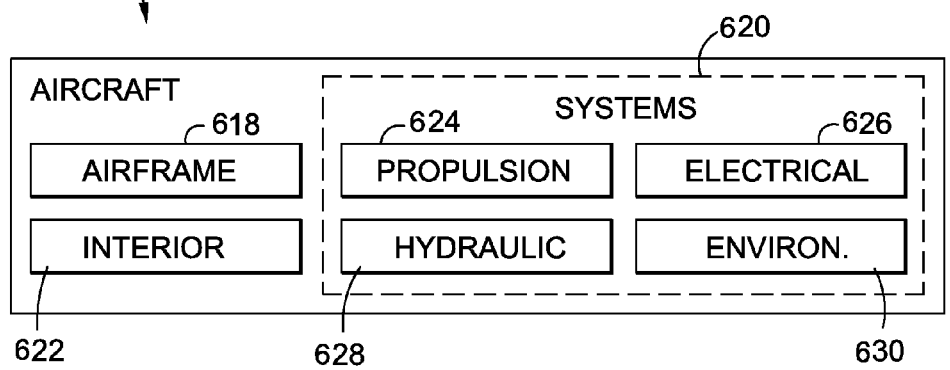
FIG. 25 is a block diagram of an aircraft.

Referring to FIGS. 24-25, configurations of the disclosure may be described in the context of an aircraft manufacturing and service method 600 and an aircraft 602 as shown in FIG.

25. During pre-production, exemplary method 600 may include specification and design 604 of the aircraft 602 and material procurement 606. During production, component and subassembly manufacturing 608 and system integration 610 of the aircraft 602 takes place. Thereafter, the aircraft 602 may go through certification and delivery 612 in order to be placed in service 614. While in service by a customer, the aircraft 602 is scheduled for routine maintenance and service 616 (which may also include modification, reconfiguration, refurbishment, and so on)

Each of the processes of exemplary method 600 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

As shown in FIG. 25, the aircraft 602 produced by exemplary method 600 may include an airframe 618 with a plurality of systems 620 and an interior 622. Examples of high-level systems 620 include one or more of a propulsion system 624, an electrical system 626, a hydraulic system 628, and an environmental system 630. Any number of other systems may be included. Although an aerospace example is shown, the principles of the disclosure may be applied to other industries, such as the automotive industry.

Apparatus and methods configured herein may be employed during any one or more of the processes of the aircraft manufacturing and service method 600. For example, components or subassemblies corresponding to production process 608 may be fabricated or manufactured in a manner similar to components or subassemblies produced while the aircraft 602 is in service 614. Also, one or more apparatus configurations, method configurations, or a combination thereof may be utilized during the production processes 608 and 610, for example, by expediting assembly of or reducing the cost of an aircraft 602. Similarly, one or more of apparatus configurations, method configurations, or a combination thereof may be utilized while the aircraft 602 is in service, for example and without limitation, to maintenance and service 616.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A two-piece, one-sided-installation fastener system in combination with an installation tool, comprising:
   an internally-threaded sleeve having a shank and a sleeve head, the shank including a localized annealed portion extending along a portion of a sleeve length and adapted to buckle against a structure into a buckled sleeve portion;
   an externally-threaded core bolt having a frangible driving provision and a core bolt head, the frangible driving provision including external annular grooves and a pair of exterior diametrical flats; and
   an installation tool including a housing having a segmented collet axially slidable within the housing and configured to radially expand during axial movement over the frangible driving provision, the segmented collet having interior annular grooves engageable to the external annular grooves of the frangible driving provision after the segmented collet is axially moved over the frangible driving provision, the segmented collet configured to axially translate the core bolt relative to the sleeve independent of rotation of the core bolt to form the buckled sleeve portion, the collet including a pair of interior diametrical flats configured to engage the pair of exterior diametrical flats of the frangible driving provision and rotate the core bolt relative to the sleeve to increase a tension preload on the core bolt.

2. The system of claim 1, wherein the buckled sleeve portion has a minimum diameter of approximately 1.2 times the sleeve outside diameter when the buckled sleeve portion is buckled against the structure.

3. The system of claim 1, wherein the sleeve includes a locking feature restricting rotation of the core bolt relative to the sleeve.

4. The system of claim 1, wherein the sleeve head includes an anti-rotation feature.

5. The system of claim 4, wherein the anti-rotation feature comprises at least one of an indentation and a protrusion on the sleeve head.

6. The system of claim 4, wherein:
   the installation tool includes a sleeve engagement feature configured to engage the anti-rotation feature for preventing rotation of the sleeve relative to a hole when rotating the core bolt relative to the sleeve.

7. The system of claim 1, wherein the frangible driving provision comprises a frangible pintail having a break groove at an interface between the frangible pintail and the core bolt head.

8. The system of claim 1, wherein:
   the installation tool includes an ejection spring configured to eject the frangible driving provision from the installation tool after the frangible driving provision fractures off of the core bolt head.

9. The system of claim 1, wherein:
   the annular grooves have ramped surfaces allowing the collet to slidably release the frangible driving provision after fracturing off of the core bolt head.

10. The system of claim 1, wherein the core bolt and/or the sleeve are formed of at least one of:
    titanium, steel, stainless steel, inconel, nickel, and cobalt.

11. A two-piece, one-sided-installation fastener system in combination with an installation tool, comprising:
    an internally-threaded sleeve having a shank and a sleeve head, the shank including a localized annealed portion extending along a portion of a sleeve length and adapted to buckle against a structure into a buckled sleeve portion;
    an externally-threaded core bolt having a frangible driving provision and a core bolt head, the frangible driving provision including external annular grooves and a pair of exterior diametrical flats;
    an installation tool including a housing having a taper on a housing interior and having a segmented collet axially slidable within the housing and configured to radially expand during axial movement over the external annular grooves for engagement with interior annular grooves of the segmented collet, the segmented collet configured to axially translate the core bolt relative to the sleeve independent of rotation of the core bolt to form the buckled sleeve portion, the collet including a pair of interior diametrical flats configured to engage the pair of exterior diametrical flats and rotate the core bolt relative to the sleeve to increase a tension preload on the core bolt; and an outer surface of the collet configured to bear against the taper and increase a clamping force of the collet on the frangible driving provision as the collet and core bolt are axially moved relative to the housing during forming of the buckled sleeve portion.

\* \* \* \* \*